US005243509A

United States Patent [19]

Laeuffer

[11] Patent Number: 5,243,509
[45] Date of Patent: Sep. 7, 1993

[54] VARIABLE FREQUENCY RESONANT CONVERTER

[75] Inventor: Jacques Laeuffer, Paris, France
[73] Assignee: General Electric CGR S.A., Issy les Moulineaux, France

[21] Appl. No.: 744,437
[22] Filed: Aug. 13, 1991

[30] Foreign Application Priority Data

Aug. 14, 1990 [FR] France ........................ 9010348

[51] Int. Cl.[5] ........................ H02M 3/337
[52] U.S. Cl. ........................ 363/17; 363/132
[58] Field of Search ........................ 363/17, 27, 28, 98, 363/132; 378/111, 112, 113

[56] References Cited

U.S. PATENT DOCUMENTS

| | | | |
|---|---|---|---|
| 4,295,049 | 10/1981 | Ebersberger | 378/112 |
| 4,541,041 | 9/1985 | Park et al. | 363/17 |
| 5,001,618 | 3/1991 | Laeuffer | 363/28 |
| 5,055,993 | 10/1991 | Miyata et al. | 363/98 |

FOREIGN PATENT DOCUMENTS

| | | | |
|---|---|---|---|
| 192553 | 8/1986 | European Pat. Off. . | |
| 253417 | 1/1988 | European Pat. Off. . | |
| 3600205 | 8/1986 | Fed. Rep. of Germany . | |
| 8103265 | 2/1983 | Netherlands | 363/28 |
| 2045019 | 10/1980 | United Kingdom . | |
| 2100480 | 12/1982 | United Kingdom . | |

*Primary Examiner*—William H. Beha, Jr.
*Attorney, Agent, or Firm*—Pollock, VandeSande & Priddy

[57] ABSTRACT

Disclosed is a device to obtain a DC voltage $V_p$ that is adjustable in a wide range of values. To a rectifying and filtering circuit, there are applied AC pulses. The quantity of electricity of these AC pulses is constant for each pulse, and their frequency F varies as a function of the voltage $V_p$ to be obtained. To this effect, a DC/AC converter of the hyporesonant type is used. The device can be used for providing bias for a focusing element of an X-ray tube.

2 Claims, 4 Drawing Sheets

VARIABLE FREQUENCY RESONANT CONVERTER

BACKGROUND OF THE INVENTION

1. Field of the Invention

The present invention relates to devices used to obtain a DC voltage, the value of which is adjustable over a wide range of values. Said devices are more particularly suited to providing the bias needed for focusing an X-ray beam, at a value that is chosen by the practitioner who uses the radiological installation.

A radiology tube is generally constituted like a diode, that is, it is constituted by two electrodes, one of which, called a cathode, emits electrons while the other, called an anode receives these electrons on a small surface that constitutes the source of X-radiation.

The cathode has a filament heated by an electrical current that constitutes the electron source. When a high voltage, given by a generator, is applied to the terminals of both electrodes so that the cathode is at a negative potential, a so-called anode current is set up through the generator and crosses the space between the cathode and the anode in the form of an electron beam.

To focus the electron beam, a metal element, called a focusing element, supporting the filament, is insulated from this filament and taken to a negative potential, called a bias potential, that is negative with respect to said filament. Furthermore, to modify the shape and hence the focusing of the electron beam, it is the common practice to modify this bias voltage over a wide range of values, for example between 300 and 3,000 volts. Besides, it must be noted that the cathode is itself taken to a voltage of the order of −20 to −75 kilovolts with respect to the ground. This raises problems of insulation in the application of this bias potential or voltage.

The invention more particularly relates to a device used to obtain a bias voltage for a focusing element of an X-ray tube cathode that can be made to vary over a wide range of values.

2. Description of the Prior Art

Such devices are known and, by way of indication, FIG. 1 shows a schematic diagram of a prior art device. This device has a supply circuit 10 that gives a regulated and adjustable DC voltage E from an AC voltage supplied by the mains. The voltage E is applied to the terminals of a DC/AC converter 11 that comprises a chopper circuit 12 and a control circuit 14.

The AC signal given by the DC/AC converter 11 is applied to a voltage step-up transformer 15, the secondary winding of which is connected to a rectifying and filtering circuit 16. This circuit 16 gives a DC voltage $V_s$ that is applied between the focusing element and the filament of the X-ray tube.

It must be noted that, since the voltage $V_s$ is difficult to measure owing to the high potential of the common mode (20 to 75 kilovolts), it is preferable to measure the voltage E which is substantially proportional to it and to regulate it. To this end, the voltage E is measured by a resistive divider comprising the resistors R1 and R2 and the divided signal is applied to a voltage/frequency converter circuit 20 which furthermore receives a signal $V_{ref}$ corresponding to the voltage that is to be obtained between the focusing element and the filament of the X-ray tube. The converter circuit 20 gives pulses of adjustable frequency and/or adjustable duration. These pulses activate the switches of the supply circuit 10 so as to modify the output voltage E and hence modify the voltage $V_s$ to obtain $V_s=V_{ref}$.

In a standard way, the chopper circuit 12 includes, for example, two transistors 21 and 22, the opening and closing of which are controlled by the control circuit 14.

The control circuit 14 is also a voltage/frequency control circuit similar to the circuit 20 but with a fixed frequency.

The drawbacks of this prior art device that has just been described are that:

- it necessitates two power converters: the first power converter circuit 20 to regulate the voltage E and the second power converter circuit 14 to obtain an AC voltage.
- it switches over the current in the semiconductors abruptly, and this is a source of parasitic phenomena;
- it has a low range of output voltages, for the voltage E that is adjusted cannot tend towards zero because of the limitations in the cyclical ratio of the chopper circuit.

SUMMARY OF THE INVENTION

The object of the present invention, therefore, is to make a device for obtaining an adjustable DC voltage that does not have the above-mentioned drawbacks.

The invention relates to a device used to obtain an adjustable DC voltage $V_p$, said device comprising:

- supply means for providing a constant DC voltage E,
- means for converting said DC voltage E so as to obtain AC pulses of a frequency F, each corresponding to a quantity of electricity that is constant from one pulse to the next one,
- means for rectifying and filtering said AC pulses so as to obtain said DC voltage $V_p$,
- means for modifying the frequency F of said AC pulses as a function of the DC voltage $V_p$ that is to be obtained.

The DC/AC converter comprises an oscillating circuit with a resonance frequency that is higher than the frequency F.

The frequency F is determined by the calibration of the device, by plotting the curve $V_p=f(F)$. The characteristics of this curve are recorded by a microprocessor.

BRIEF DESCRIPTION OF THE DRAWINGS

Other objects, features and advantages of the present invention shall appear from the following description of a particular exemplary embodiment, said description being made with reference to the appended drawings, of which.

DETAILED DESCRIPTION OF THE INVENTION

Figure 1:
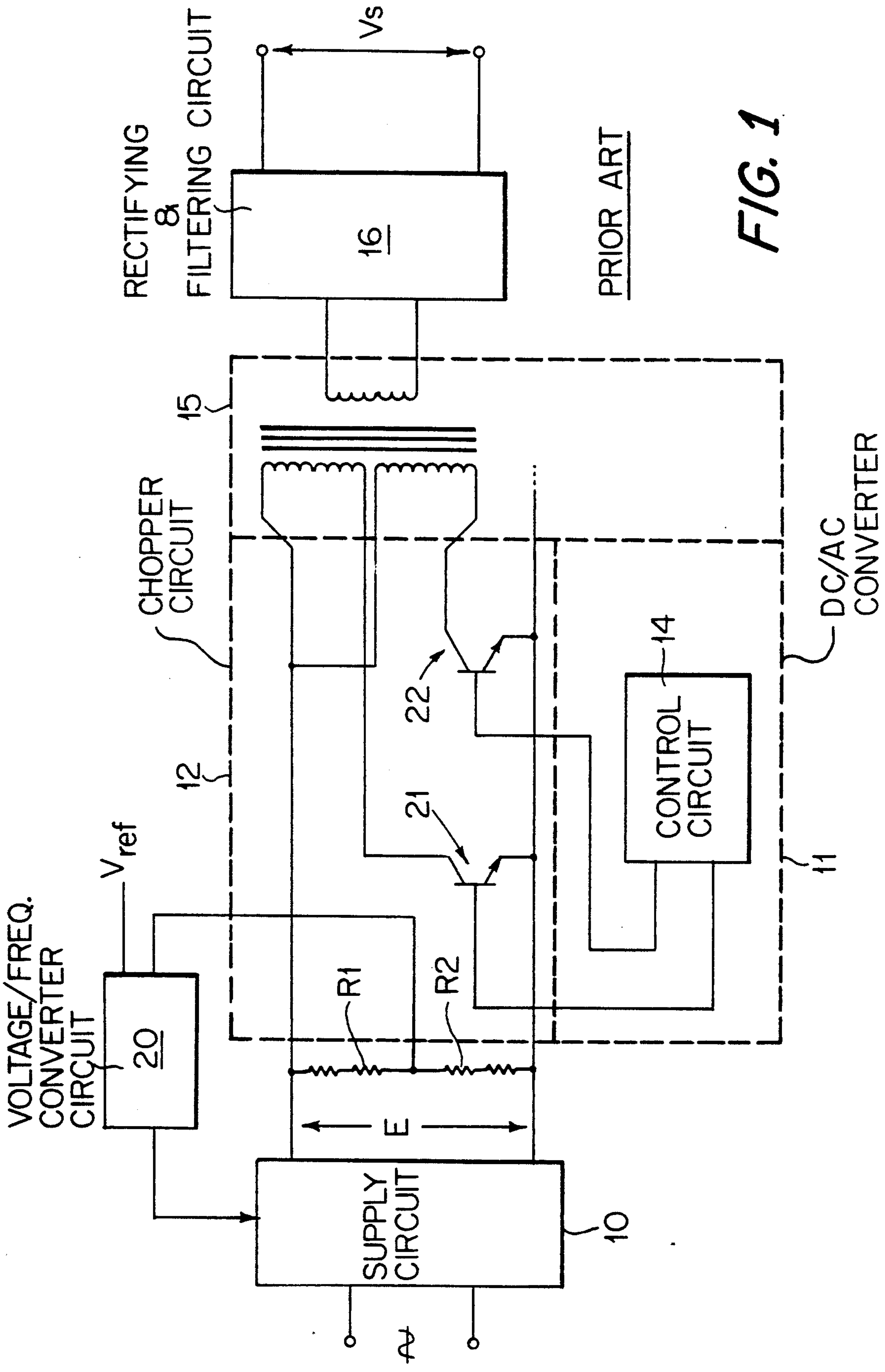
- FIG. 1 is a schematic diagram of a device used to obtain an adjustable DC voltage according to prior art.
Figure 2:
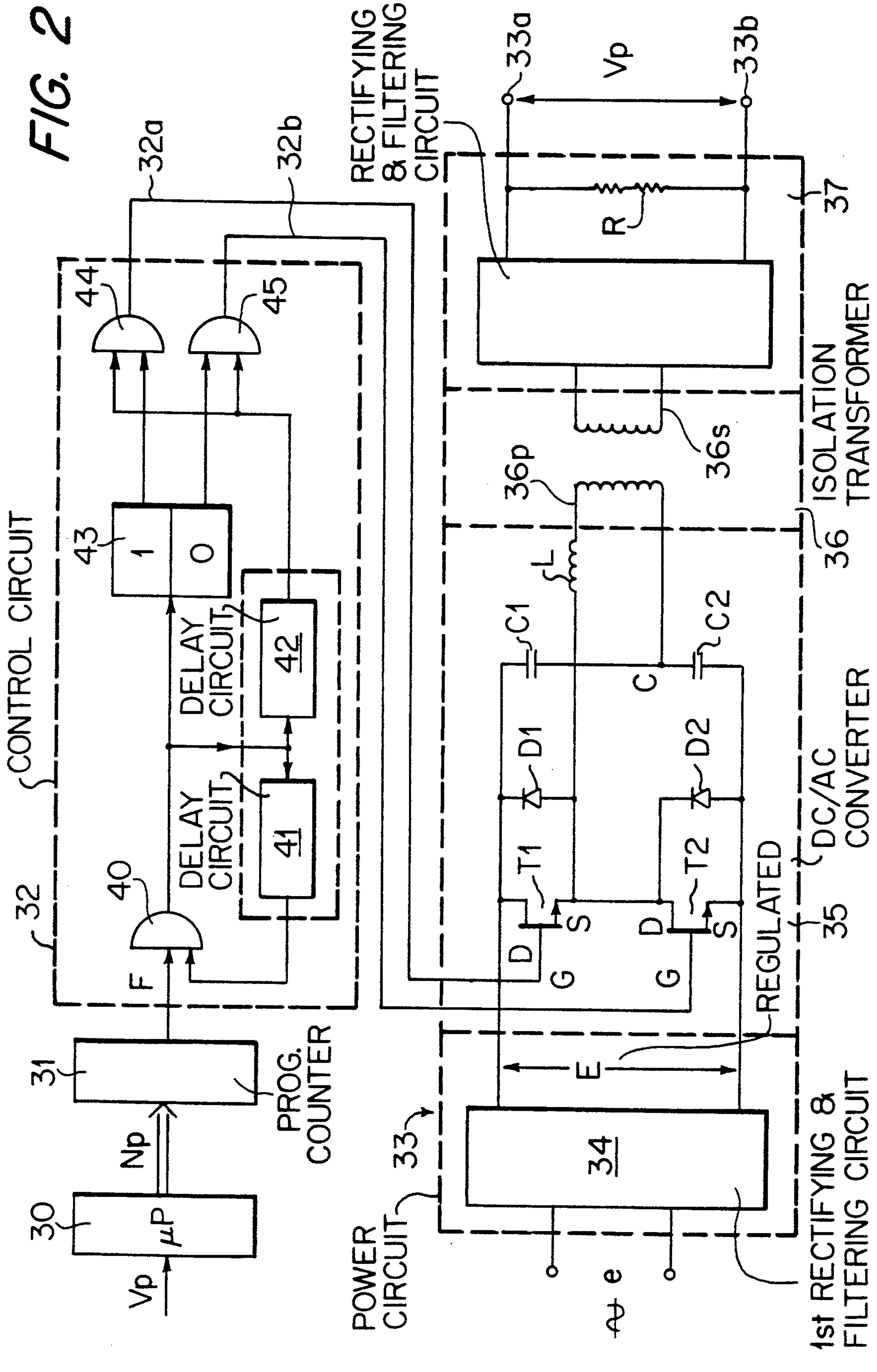
- FIG. 2 is a schematic diagram of a device used to obtain an adjustable DC voltage according to the invention.

According to the schematic diagram of FIG. 2, the device used to obtain an adjustable DC voltage according to the invention comprises:

- a microprocessor 30, to which is applied a control signal indicating the value of a DC voltage $V_p$ to be obtained, said microprocessor 30 giving a digital signal $N_p$ that indicates a frequency F which is characteristic of the DC voltage $V_p$ to be obtained;

- a programmable counter 31 to which is applied the digital signal $N_p$ corresponding to the signal $V_p$ given by the microprocessor 30, said programmable counter 31 giving pulses of frequency F which is variable according to the value of $N_p$ and, hence, according to the value of $V_p$,

- a control circuit 32, to which are applied the variable frequency F pulses, said control circuit 32 giving, at its output terminals 32*a* and 32*b*, control pulses of switches T1 and T2 of a DC/AC converter 35, and

- a power circuit 33, including the DC/AC converter 35, that gives the DC voltage $V_p$ at its output terminals 33*a* and 33*b*.

The power circuit 33 includes, in addition to the DC/AC converter 35, a first rectifying and filtering circuit 34 which, from an AC voltage e, gives a regulated DC voltage E that is applied to the switches T1 and T2. The pulses given by the DC/AC converter 35 are applied to the primary winding 36*p* of a pulse type isolating transformer 36, the secondary winding 36*s* of which is connected to a rectifying and filtering circuit 37 which gives the requisite DC voltage $V_p$.

As indicated hereabove, the DC/AC converter 35 has at least two switches T1 and T2, formed by field-effect transistors according to metal-oxide semiconductor technology (i.e. these transistors are MOSFETs). By construction, each of these transistors T1 and T2 has, in parallel, a diode D1 for the transistor T1 and a diode D2 for the transistor T2. The anode of each of these diodes is connected to the source S of the associated transistor and the cathode of each of said diodes is connected to the drain D of said associated transistor. The gate G of the transistor T1 is connected to the output terminal 32*a* of the control circuit 32 while the gate G of the transistor T2 is connected to the output terminal 32*b* of the control circuit 32.

The DC/AC converter also includes a resonant circuit formed by capacitors C1 and C2 and by a coil L. The capacitors C1 and C2 are series-connected between the drain D of the transistor T1 and the source S of the transistor T2, while the coil L is placed in the primary winding 36*p* of the transformer 36 and is connected, on one side, directly to the source of the transistor T1 and, on the other side, to the common point C of the capacitors C1 and C2 by means of the primary winding 36*p* of the transformer 36.

As it is known, the DC/AC converter may have only one capacitor instead of two capacitors C1 and C2. This single capacitor would be connected, for example, to the negative terminal of the supply circuit 34.

The rectifying and filtering circuit 37 is of a standard type and has an output resistor R. The bias voltage $V_p$ is taken at the terminals of this output resistor R.

The control circuit 32 has a first logic AND circuit 40 that comprises two input terminals, to one of which is applied the adjustable frequency F pulses given by the counter circuit 31 while the other input terminal is connected to a first delay circuit 41, the delay of which is $\Theta_1$. The output terminal of the AND circuit 40 is connected, firstly, to a bistable circuit 43 and, secondly, to the first delay circuit 41 as well as to a second delay circuit 42, the delay of which is $\Theta_2$.

The output terminal corresponding to the state 1 of the bistable circuit 43 is connected to one of the two inputs of a second logic AND circuit 44 while the output terminal corresponding to the state 0 is connected to one of the two input terminals of a third logic AND circuit 45. The second input terminal of the AND circuits 44 and 45 is connected to the output terminal of the second delay circuit 42.

The microprocessor 30 performs the function:

$$N_p = f(V_p)$$

i.e., for each value of the bias voltage $V_p$, chosen by the practitioner or by the control device, it gives a digital code, for example a code with eight digits. This code, when applied to the counter 31, leads this counter to give frequency F pulses. These frequency F pulses are aimed at controlling the transistors T1 and T2 alternately by means of the circuit 32, so as to create current pulses. The rectifying and filtering of these current pulses in the circuit 37 lead to the desired voltage $V_p$ between the terminals 33*a* and 33 *b*.

In other words, the microprocessor 30 and the counter 31 perform the function $F = f'(V_p)$. This function is obtained by calibration and its shape is given by the curve 81 in FIG. 3*a*. This curve 81 takes account of the linearity defects of the system while the curve 80 is a theoretical curve.

Figure 3A:
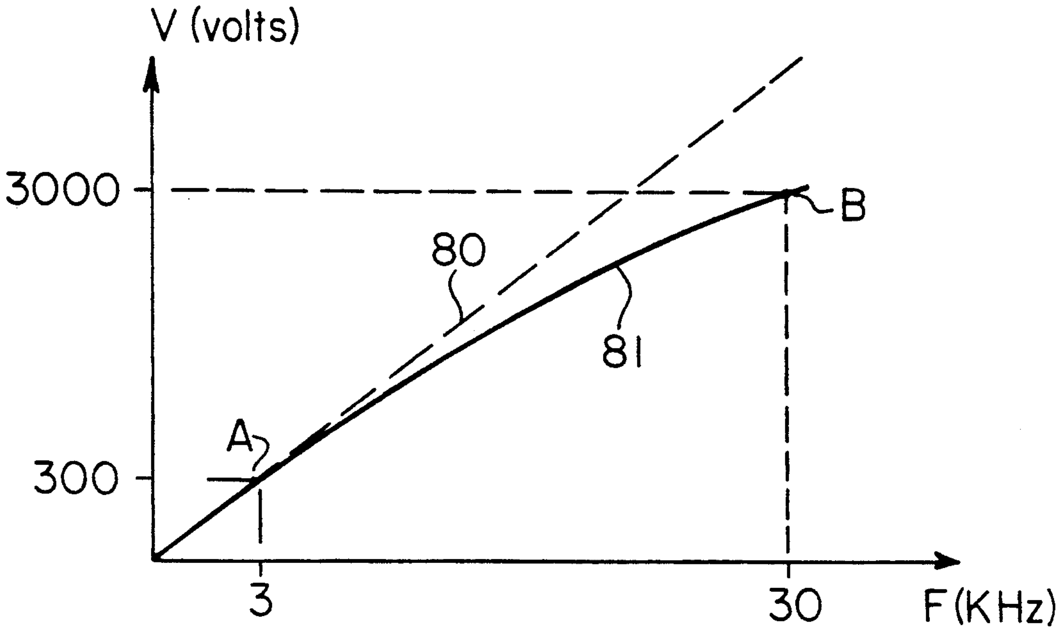
- FIGS. 3*a* and 3*b* are graphs showing, firstly, a calibration curve of the device and, secondly, the linearity features of the device according to the invention.

The operation of the device according to the invention shall now be explained with the help of FIG. 2 and the graphs of FIGS. 3 and 4. To a bias voltage $V_p$ chosen by the practitioner or by the control device of the radiological apparatus, there corresponds a digital code $N_p$. This digital code $N_p$, when applied to the counter 31, leads this counter to give pulses 70 and 70' (FIG. 4*a*) at the frequency F according to the correspondence given by the curve 81 of FIG. 3*a*. These pulses have, for example, a frequency of 30 kilohertz to obtain $V_p = 3{,}000$ volts and a duration of about one microsecond. If it is assumed that the delay circuit 41 gives an opening signal 71, the pulse 70 activates the changing of the state of the bistable circuit 43 which turns, for example, to the state 1. The pulse 70 activates the delay circuit 41 to end the opening signal 71 (FIG. 4*c*) so that the AND circuit 40 closes for a duration $\Theta_1$. The pulse 70 also activates the delay circuit 42 to make it give a signal T'1 with a duration $\Theta_2$ (FIG. 4*b*) that turns the AND circuits 44 and 45 on. Only the AND circuit 44, which receives the state 1 signal from the bistable circuit 43, gives a signal T'1 that makes the transistor T1 conductive at the instant $t_0$ (FIG. 4*d*).

This signal T'1 makes the transistor T1 conductive and keeps it in this state, and a current $i_1$ (FIG. 4*d*), called a positive current, flows in the transistor T1, the coil L, the primary winding 36*p* of the transformer 36, the capacitors C1 and C2 (in fact $i_1/2$ in each capacitor) and the supply circuit 34.

This current $i_1$ gives rise to a square-wave voltage V (FIG. 4*e*) at the terminals of the primary winding 36*p*, and the result thereof is a current I(t) (FIG. 4*f*) in the secondary winding 36*s* of the transformer 36. This current has a shape identical to that of the current $i_1$ flowing in the primary winding.

The current $I_1$ charges the capacitor C2 and discharges the capacitor C1 and their charging voltage counters the flow of the current $i_1$ so that this current $i_1$ gets cancelled out at the instant $t_1$, i.e. before the end of the signal T'1. The capacitor C2 then gets discharged while the capacitor C1 gets charged and a current $i_2$ (FIG. 4*d*), called a negative current, flows in the capacitors C1 and C2 (in fact $i_2/2$ in each capacitor), the primary winding 36*p*, the coil L, the diode D1 and the supply circuit 34.

This negative current gives rise to a square-wave negative voltage (FIG. 4*e*) at the terminals of the primary winding 36*p* and, consequently, to a negative current I(t) (FIG. 4*f*) in the secondary winding 36*s*. When the current $i_2$ gets cancelled out, the pulse is ended.

Before the instant $t_2$, the signal T'1 comes to an end by the effect of the delay circuit 42 introducing a delay $\Theta_2$ so that the AND circuits 44 and 45 are off.

After the instant $t_2$, and more precisely after a delay $\Theta_1$ reckoned from the end of the signal 71 (FIG. 4*c*), the delay circuit 41 gives a signal 71' that turns the AND circuit 40 on.

After a variable period of time defined by the frequency F, a pulse 70' is given by the counter 31, and its leading edge activates the change in the state of the bistable circuit 43, which turns to the state 0, as well as the zero-setting of the delay circuits 41 and 42.

This zero-setting operation has the effect of ending the signal 71' and giving the signal T'2 which opens the AND circuits 44 and 45. Since the bistable circuit 43 is in the state 0, only the AND circuit 45 gives an output signal at the terminal 32*b* and a pulse is applied to the control electrode of the transistor T2 at the instant $t'_0$ to make it conductive. A current $i'_1$, called a negative current, then flows in the transistor T2, the circuit 34, the capacitors C1 and C2 (in fact $i'_1/2$ in each capacitor), the primary winding 36*p* of the transformer 36 and the coil L. This negative current gives rise to a square-wave negative voltage V(FIG. 4*e*) at the terminals of the primary winding 36*p*, and the result thereof is a negative current I(t) (FIG. 4*f*) in the secondary winding 36*s* of the transformer 36. This current has a shape identical to that of the current $i'_1$ flowing in the primary winding.

The negative current $I'_1$ charges the capacitor C1 and discharges the capacitor C2 and their charging voltage counters the flow of the current $i'_1$ so that this current $i'_1$ gets cancelled out at the instant $t'_1$. The capacitor C1 then gets discharged while the capacitor C2 gets charged and a positive current $i'_2$ flows in the capacitors C1 and C2 (in fact $i'_2/2$ in each capacitor), the primary winding 36*p*, the coil L, the diode D2 and the supply circuit 34. This positive current gives rise to a square-wave positive voltage (FIG. 4*e*) at the terminals of the primary winding 36*p* and, consequently, to a positive current I(t) (FIG. 4*f*) in the secondary winding 36*s*. When the current $i'_2$ gets cancelled out, the pulse is ended.

The pulses thus created by the DC/AC converter 35 are applied to the transformer 36 and are rectified and filtered in the circuit 37 and, at the terminals of the load resistor R, there appears a voltage $V_p$ corresponding to the frequency $V_p$ corresponding to the frequency F determined by calibration.

This relationship between the frequency F and the voltage $V_p$ results from the fact that the electrical charge contained in each pulse (FIGS. 4*d* and 4*f*) is always the same whatever may be the point of operation, provided that the frequency F is lower than the frequency of the resonant circuit of the DC/AC converter. This means that the DC/AC converter is of the pulse hyporesonant type.

As a matter of fact, the electrical charge Q of a pulse (FIG. 4*d*) is given by:

$$Q = \int_{t_0}^{t_2} |I|\,dt = \frac{T}{2} \times \frac{2}{\pi} \times \frac{E/2 + V}{Z} + \frac{T}{2} \times \frac{2}{\pi}\ \frac{E/2 - V}{Z}$$

with

E : the supply voltage

V : the voltage at the terminals of the primary winding 36*p*

$Z=\sqrt{L/C}$: the impedance of the resonant circuit with $C=C1+C2$ $T=2\pi\sqrt{LC}$ giving $Q=2$ CE, i.e. a constant if E and C are constant, which is the case as the supply circuit 34 gives a regulated voltage and the capacitance C is fixed by construction.

The current $I_r$ that flows in the load resistor R is given by:

$$I_r = Q \times F$$

so that the voltage $V_p = RI_r = R \times Q \times F$, which means that $V_p$ is proportional to F for R and Q are constant. This corresponds to the dashed curve 80 of FIG. 3*a*. However, in practice, the phenomenon is not perfectly linear and the real curve is the one referenced 81. If the device according to the invention is to work according to the curve 81, it is necessary to carry out a calibration in using at least two points of operation, for example those defined by A and B on the curve 81.

Figure 3B:
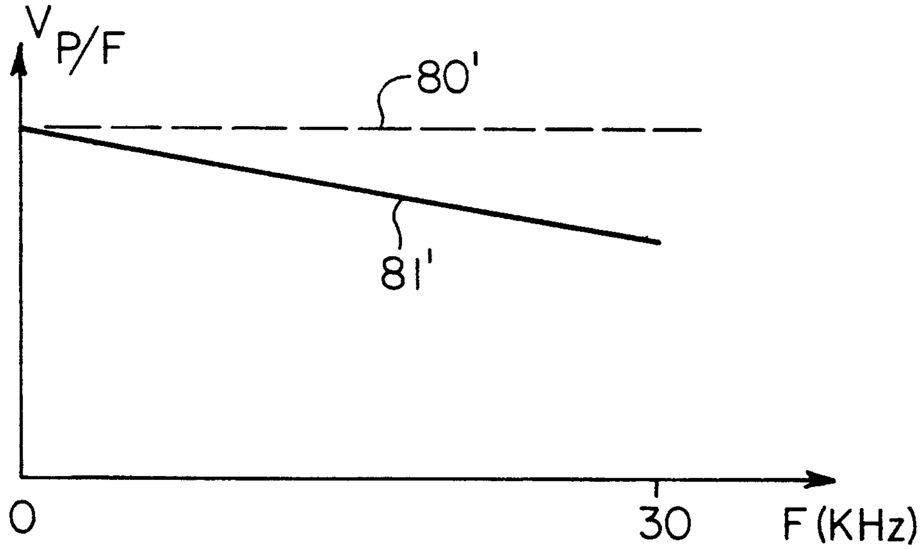

The curves 80' and 81' of FIG. 3*b* show the variations of the ratio $V_p/F$ as a function of the frequency F in correspondence with the curves 80 and 81 respectively of FIG. 3*a*. These curves and, notably, the real curve 81' resulting from the calibration, is linear throughout the range.

In the description of the operation of the DC/AC converter 35, it has been stated that the currents $i_1$, $i_2$, $i'_1$, $i'_2$ flow in the capacitors C1 and C2, but it is clear that each of these currents is divided into two equal parts at the point C, one half going towards the arm containing the capacitor C1 and the other half going towards the arm containing the capacitor C2.

Figure 4A:
- FIGS. 4*a* to 4*f* are graphs enabling an understanding of the operation of the device according to the invention.
Figure 4B:
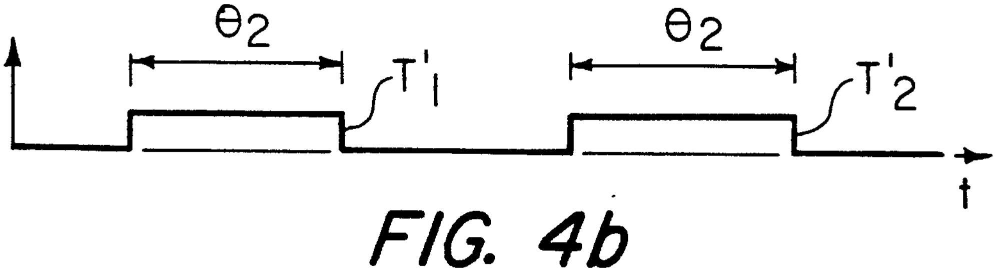
Figure 4C:
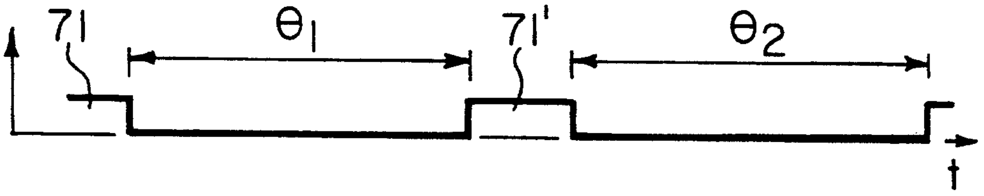
Figure 4D:
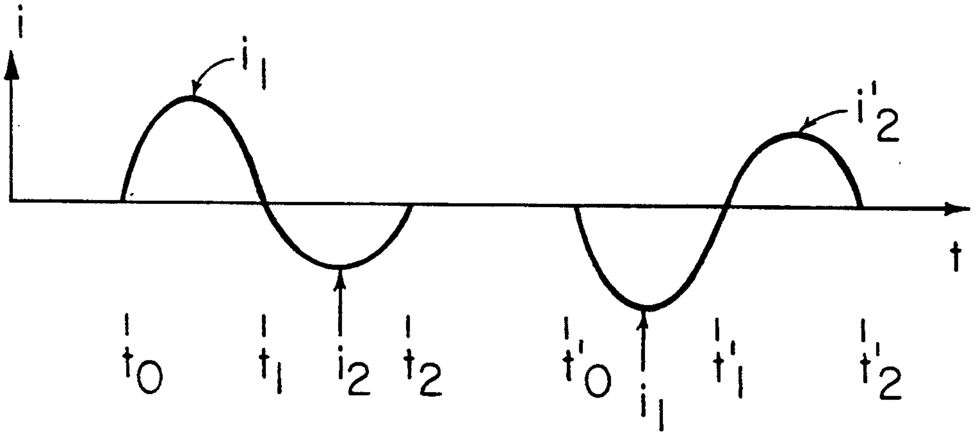
Figure 4E:
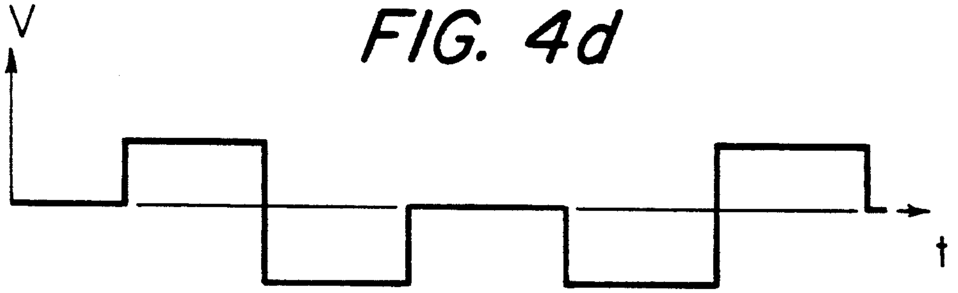
Figure 4F:
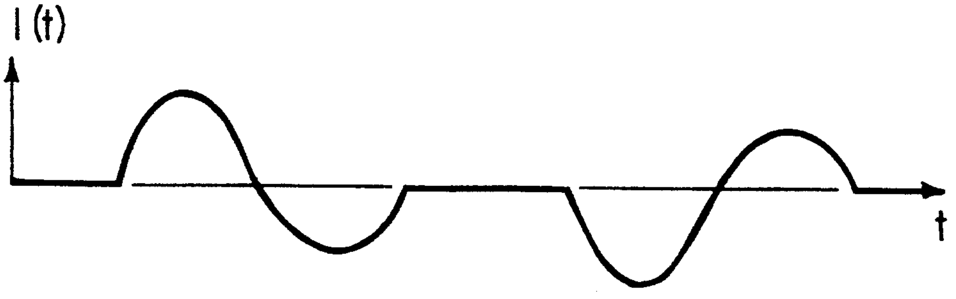

The rectangular shape of the signals of FIG. 4*e* results from the presence of the rectifying and filtering circuit 37 comprising diodes which, in becoming conductive, set up short-circuits.

What is claimed is:

1. A device to obtain an adjustable DC voltage, said device comprising:

supply means for providing a constant DC voltage;

means for converting said DC voltage to AC pulses of a frequency F, each of said AC pulses having an amplitude that is constant from one pulse to the next pulse, said DC/AC converting means including an oscillating circuit having a resonance frequency higher than said frequency F;

means for rectifying and filtering said AC pulses to obtain said DC voltage;

means for modifying said frequency F of said AC pulses as a function of said DC voltage, said modifying means including:

processor means for determining said frequency F of said AC pulses by calibrating, per a correspondence table between the DC voltage to be obtained and the frequency F of the AC pulses, a frequency F having a value which corresponds to said DC voltage;

means for generating control pulses at said frequency F from the value of said frequency F, said control pulses being applied to said converting means wherein said means for generating control pulses at said frequency F includes:

a counter circuit for outputting frequency F pulses; and a logic circuit that provides control signals for controlling said DC/AC converting means, the duration of said control signals being greater than one half-period but smaller than said resonance frequency, the repetition period of said control signals being at most equal to said resonance frequency.

2. A device according to claim 1, wherein said logic circuit comprises:

a first AND circuit having a first input terminal connected to the output terminal of said counter circuit;

a bistable circuit having a control input terminal connected to the output terminal of said first AND circuit, said bistable circuit changing its state in response to each signal provided by said first AND circuit;

a second AND circuit having a first input terminal connected to an output terminal of said bistable circuit corresponding to a first state;

a third AND circuit having a first input terminal connected to a second output terminal of said bistable circuit corresponding to a second state;

a first delay circuit having an input terminal connected to the output terminal of said first AND circuit and an output terminal connected to a second input terminal of said first AND circuit; and a second delay circuit having an input terminal connected to the output terminal of said first AND circuit and an output terminal connected to a second input terminal of said second and third AND circuits.

* * * * *

UNITED STATES PATENT AND TRADEMARK OFFICE

CERTIFICATE OF CORRECTION

PATENT NO. : 5,243,509

DATED : September 7, 1993

INVENTOR(S) : Jacques Laeuffer

It is certified that error appears in the above-identified patent and that said Letters Patent is hereby corrected as shown below:

Column 4, line 6, change "1" to --1--;
Column 4, line 9, change "0" to --0--;
Column 4, line 48, change "1" to --1--;
Column 4, line 54, change "1" to --1--;
Column 5, line 27, change "0" to --0--;
Column 5, line 32, change "0" to --0--;
Column 6, line 44, change "is" to --are--.

Signed and Sealed this

Nineteenth Day of April, 1994

*Attest:*

BRUCE LEHMAN

*Attesting Officer* *Commissioner of Patents and Trademarks*